Feb. 26, 1935.  D. KATZ  1,992,214

TRAFFIC DETECTOR

Filed Nov. 12, 1928  3 Sheets-Sheet 1

INVENTOR.
David Katz

Feb. 26, 1935.　　　　D. KATZ　　　　1,992,214
TRAFFIC DETECTOR
Filed Nov. 12, 1928　　3 Sheets-Sheet 3
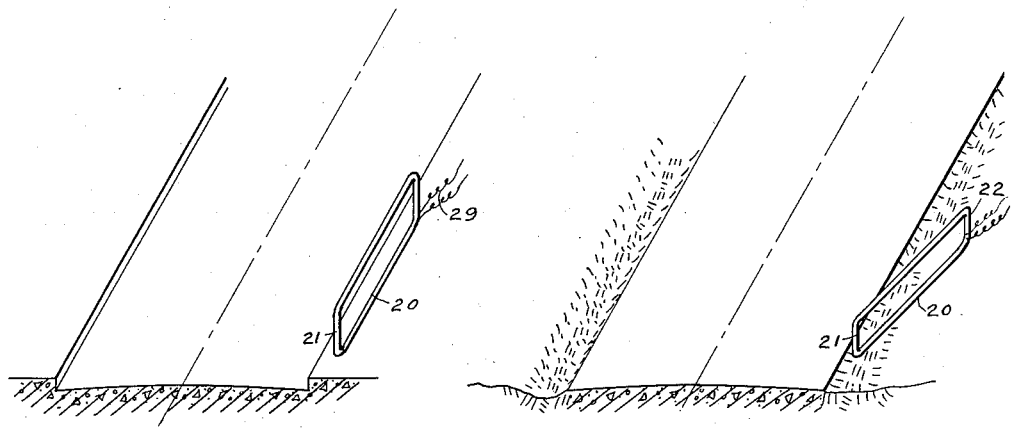
FIG. 14　　　　FIG. 15
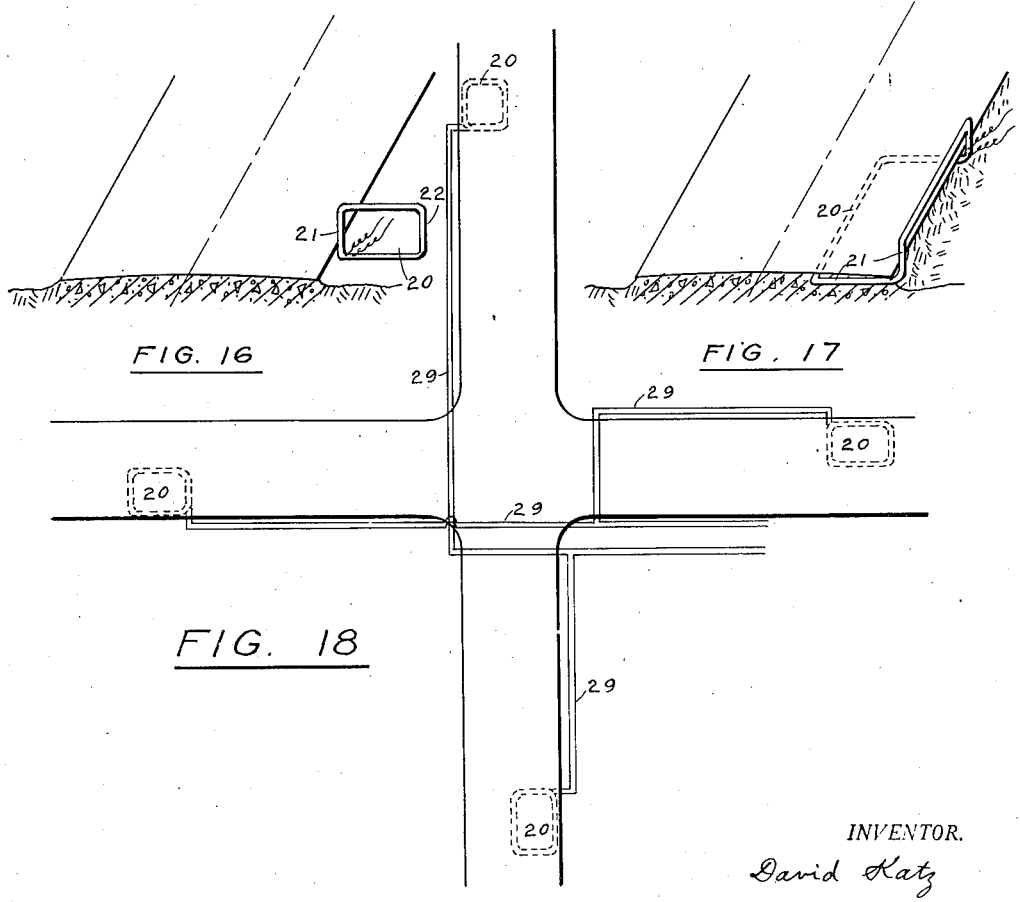
FIG. 16　　　　FIG. 17
FIG. 18
INVENTOR.
David Katz Patented Feb. 26, 1935

1,992,214

UNITED STATES PATENT OFFICE 1,992,214

TRAFFIC DETECTOR

David Katz, Washington, D. C.

Application November 12, 1928, Serial No. 318,710

12 Claims. (Cl. 177—329)

This invention relates to traffic control devices. It is my object to produce a device whereby a mechanism or a signal may be automatically actuated each time a vehicle like an automobile or a truck passes a predetermined point in a given road. By "actuation" or "registration" I mean that the passage of the vehicle at the given point automatically causes a lever to be moved, or an electric contact to be closed whereby an electric circuit may be closed and caused to produce a certain effect in a given mechanism. In a broad sense I include in the term "registration" the effecting of motion in the pointer of a meter whereby a person observing the meter may be informed about the passage of a vehicle at the given point. My invention may be utilized in street traffic regulation, in road signaling, in road advertising, and for various other purposes. Thus for instance, if my device is set so as to close an electric contact each time a vehicle passes a certain predetermined point in a given road, a device may be built which will be actuated by said "registrations" from each of the four approaches of an ordinary street intersection in accordance with a predetermined logical system depending on the density and sequence of traffic on each of the two intersecting streets. Also, for service on interurban roads, a device may be built which will respond to each registration by flashing out to the registering motorist a warning signal such as "Curve ahead", "Railroad crossing", "Speed limit 20 miles". Again, the same device may be utilized to send out warning signals to other people than the registering motorist. Thus, for instance, in connection with dangerous curves on the road where the road in advance is obscured by brush, hills, buildings, etc., a device of the type mentioned may be utilized so that each time a vehicle approaches the curve from one direction the device will automatically toot a horn or flash out sign to motorists approaching the curve from the other direction. Again a device of the same type may be utilized to automatically flash up an advertising sign or poster along the road each time a vehicle passes the given point, where such advertising is not against public policy or where it is for a public cause. Many other utilities of my invention will suggest themselves to the one skilled in the art as my description of the same proceeds.

It will be understood that to effect registration it is in most cases sufficient to effect the automatic closing of an electric contact. Depending on the circuit in which it is located, this closed contact may be utilized either for lighting a lamp directly, or for producing motion in a mechanism with the object of performing any function whatever, or it may be used to actuate a relay which then in turn sends out a reinforced current over any desirable circuit and performs any kind of work or function whatever.

Although many mechanical or semi-mechanical devices have been suggested in the art for effecting the above result, very few, if any, found actual application in practice to any appreciable extent. The reason is, that mechanical devices in general bear with them inherent objectionable features which are sufficient to prohibit their installation and use in public. Thus a mechanical device based on impact may jar the passing vehicle and make riding thereover uncomfortable. A device based on displacement will generally have in its construction cracks or loose elements into which rain and wind will constantly pack dust and dirt and quickly render the device ineffective. Snow and ice are apt to put out of commission any such mechanical contraption. Some of these mechanical devices have springs or resilient elements in their structure which must be very delicately designed; otherwise they may be either too insensitive or too fragile. Other mechanical devices have certain parts of their material constantly exposed either to the weather above or to ground moisture below. Many mechanical contraptions require considerable excavation and concrete pouring, thus being of high initial cost. Others require constant attention and repairs thus making the upkeep expensive. Finally, due to variation in size of present day vehicles, varying from motorcycles to limousines and from light automobiles to heavy trucks, and due to the considerable variations in speed of various moving vehicles, it is difficult to design a mechanical device so as to be responsive to each vehicle under most circumstances. For instance, a device sensitive enough to detect a motorcycle may be broken down by a loaded truck; a device rigid enough to support a loaded truck, may not be sufficiently sensitive to respond to a light vehicle.

Realizing the above practical difficulties, I have designed the following registering unit which is nearly, if not completely, free from all the above objections and can be positively characterized as being simple in construction, durable, reliable, inexpensive to install, inexpensive to maintain, and can be adjusted in its range of sensitivity without sacrificing durability or safety.

My invention is based on the theory, that vehicles of the automobile type carry along with them, as they travel, a magnetic field. This effect is undoubtedly due to the fact that the earth itself is a magnet, and that modern vehicles of the automobile type contain in their structure considerable quantities of iron. However, whatever the explanation, I verified my theory by experiment, and found that when an automobile type vehicle moves, it carries with it a distortion of the earth's normal magnetic field. This distortion of the earth's magnetic field, travelling along with each vehicle, I utilize in various ways to perform the registration above referred to.

I may utilize this magnetic field to disturb the normal direction of a magnetic needle, thereby effecting the closing of an electric contact. Or I may utilize it to induce a current in a conductor stretched across the path of the vehicle, according to the laws of Faraday and Lenz. This current then, usually very weak, may be utilized directly to operate a galvanometer or other electrical instrument where "registration" constitutes simply the conveyance of information to an observer. Or it may be led through a sensitive relay and reinforced sufficiently to close an electric contact or perform any other function whatever.

I shall now proceed to describe some practical methods of carrying my invention into effect and disclose what I consider at present the most practicable of all these methods. It shall be understood, however, that I am not to be limited by these specific examples, and that my invention lends itself to wide variation in practice.

Referring now to the drawings,

Figs. 1, 2, 3, and 4 show a design of my invention in which a magnetic needle is used as a detector and in which the principle of the magnetic compass is utilized.

Figs. 5 to 12 inclusive show various methods of carrying out my invention using a closed electric circuit as a detector and acting on the principle of electro-magnetic induction. Of this group—

Figure 5:
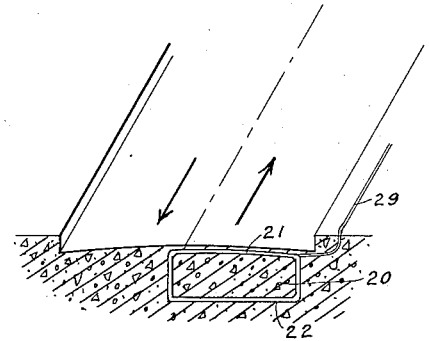

Fig. 5 is a vertical section, partly in perspective, across a road showing one method of disposing the conductor in the road.

Figure 6:
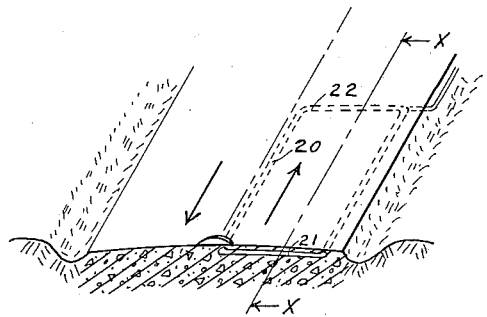

Fig. 6 is a similar view of a road showing another method of disposing the conductor in the road.

Figure 7:
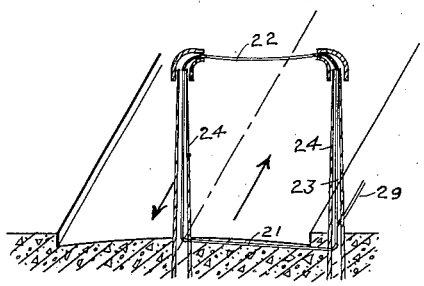

Fig. 7 is similar view of a third method of disposing the conductor.

Figure 8:
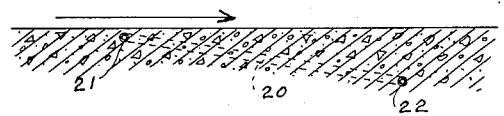

Fig. 8 is a vertical section lengthwise of the road substantially on a line corresponding to $x$—$x$ in Fig. 6, and showing a variation of the disposition illustrated in Fig. 6.

Figure 9:
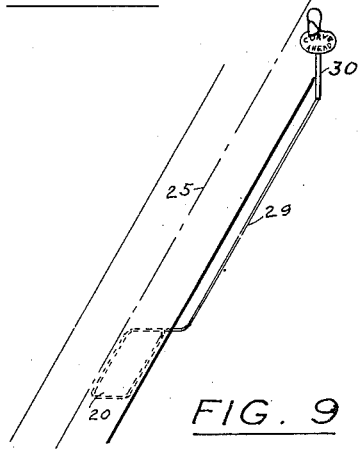

Fig. 9 is a perspective view showing the utilization of my invention where the object of the registration is to flash out a sign.

Figure 10:
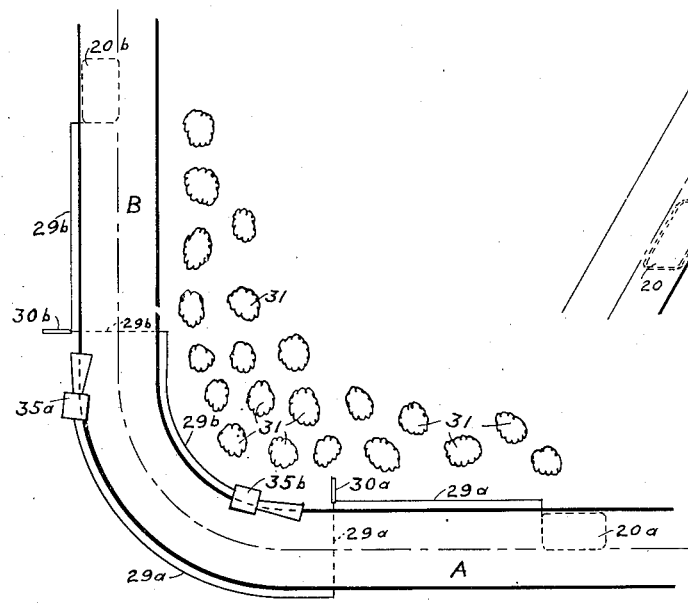

Fig. 10 is a diagrammatic illustration of how the invention may be used in connection with obscured and dangerous curves along the road to signal to persons other than the driver of the registering vehicle.

Figure 11:
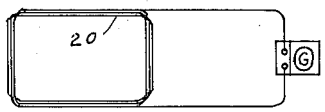

Fig. 11 is an electric diagram showing the necessary circuit where the object of registration is merely to convey information thru an electric meter to a constant observer.

Figure 12:
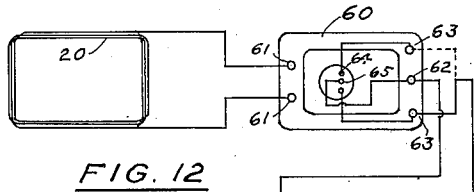

Fig. 12 is an electric diagram illustrating the utilization of my invention where the object of the registration is to close an electric contact.

Figure 13:
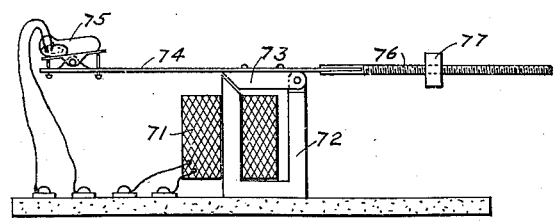

Fig. 13 is a side view, partly in section of a simple mechanism wherein the circuit of Fig. 12 may be utilized for closing an electric contact for a predetermined short interval, which is, however, longer and more readily controllable than the interval during which the contact of Fig. 12 is closed.

Figs. 14, 15, 16, and 17 are perspective views like Fig. 5, showing four additional methods of disposing the conductor with respect to the road.

Fig. 18 is a diagrammatic view showing the use of my invention in connection with an intersection of two streets or highways for the purpose of regulating the right-of-way at the intersection.

Proceeding now to discuss the figures in detail,—

Figure 1:
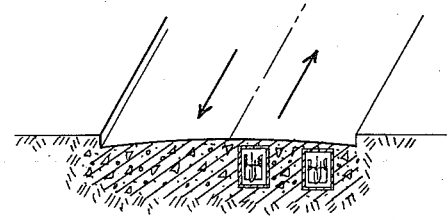
Fig. 1 is a vertical section across a road bed showing the disposition of the detector or detectors in the road.
Figure 3:
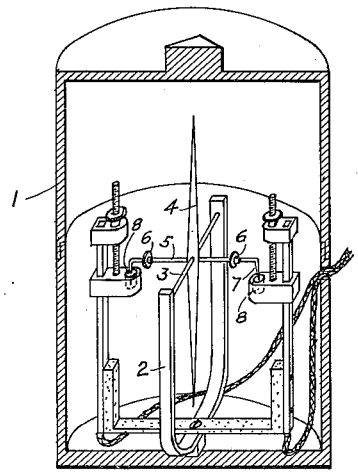
Fig. 3 is a perspective view of the detector used in Fig. 1.

The system in Fig. 1 consists of one unit, or several units suitably spaced, buried in the pavement as near to its surface as possible. Each unit consists of a suitable, moisture-proof, non-magnetic container 1 (Fig. 3) (made for instance of glazed earthware or of glass). In this container is a frame 2, on which is pivotally mounted a horizontal axis 3, supporting the vertical magnetic needle 4. This needle is balanced by two cross arms 5 carrying balancing rollers 6. If the needle is carefully balanced, it will set itself in a position following the projection of the direction of the earth's magnetic field in the particular region upon the plane in which the needle is free to swing. This projection is nearly vertical in an east-and-west plane, and at about an angle of 60° to 70° to the horizontal in a north-and-south plane. However, by adjusting the balancing rollers 6, the needle may always be made to assume a vertical direction. The cross arms 5 end in tips 7 which dip or are adapted to dip into mercury cups 8. These cups are adjusted by their supports 9 so that one of them is in permanent contact with its corresponding tip 7, while the other just barely misses touching the tip, so that a slight oscillation of the needle will cause contact at this tip also. The first mentioned tip is of sufficient length and its cup is filled with mercury to a sufficient depth, not to break contact at this point within the permissible range of oscillation of the needle. The mercury cups are electrically connected with a suitable circuit, preferably of low voltage in order to avoid sparking. When a vehicle passes in proximate neighborhood, its accompanying magnetic disturbance causes the needle to oscillate, thereby completely closing the circuit and effecting the flow of current. This current may be utilized directly for effecting certain functions, or it may be led through a relay and reinforced for the purpose of performing any desirable function whatever.

Figure 2:
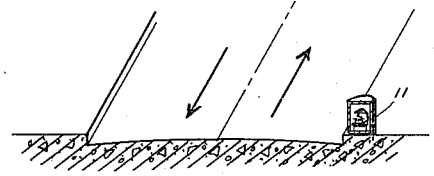
Fig. 2 is a similar view but showing a different type of detector and a different relative disposition.
Figure 4:
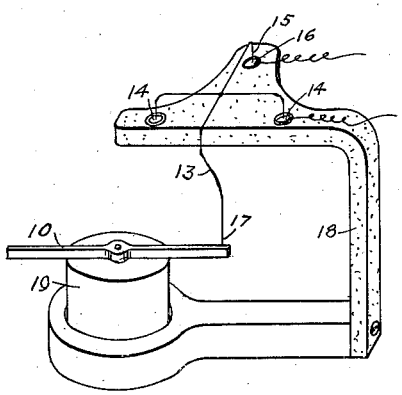
Fig. 4 is a similar view of the detector used in Fig. 2.

In Fig. 4 is shown a device utilizing a horizontal magnetic needle 10. In this case the compass need not be buried in the pavement but may be supported in a suitable nonmagnetic casing 11 on the side of the road as shown in Fig. 2, and preferably at the level of the axle of the average vehicle passing on the road. Normally this needle takes a position parallel to the horizontal component of the earth's lines of force in the particular locality. But when disturbed by the approach of an iron clad vehicle it will oscillate to the right and left of its normal position. These oscillations may be made to close an electric contact by shaking the light and carefully balanced dipper 13. This dipper may be pivotally supported in mercury cups 14, and have its beak 15 barely missing contact with another mercury cup 16. The tail 17 of the dipper is normally just barely touching the compass needle, which condition is effected by revolving the insulated support 18 around the support 19 of the needle, after the latter has assumed its natural position.

The objection to this particular type of detector is in the fact that unless the needle is extremely sensitive and very light, it will fail to respond to vehicles which travel in a path rather distant from the edge of the road. However, with suitable care in designing, this type of detector may be used successfully on narrow roads, or where the road is divided along its crest by a ridge or marker which forces all the traffic to move along the right-hand half of the road instead of along the crest.

In Figs. 5 to 17 incl. I make use of the principle of electromagnetic-induction. I have indicated above that when an iron clad vehicle moves it carries with it a disturbance or distortion in the earth's magnetic field. This disturbance has the same affect as a moving magnetic field. Consequently, if allowed to pass over a conductor it will induce therein an E. M. F., and if the circuit is closed it will cause a current to flow.

In Fig. 5 I use as the conductor a substantially rectangular coil of wire 20 buried in a vertical plane in the road, the upper leg 21 being as close to the surface as possible, while the lower leg 22 is as far removed from it as practicable. The number of turns in the coil may vary depending on the amount of induced E. M. F. desired. With a sensitive galvanometer or relay in the circuit, successful results may be obtained by using a coil of about 200 turns, the lower leg of the rectangle being about 3 to 5 feet below the surface of the pavement. The upper leg being practically flush with the pavement, the distance between the lower leg and the axle of an average automobile is about 3 to 4 times the distance between the upper leg and the same axle. Therefore, the reverse E. M. F. induced in the lower leg 22 is negligible compared to the direct E. M. F. induced in the upper leg 21. The entire coil may be enclosed in a casing or pipe being flush with the pavement; or the coil may be placed directly in the cement, in which case the upper leg is preferably a few inches below the surface of the pavement. The terminals 29 of the coil are brought out to a convenient position on the side-walk or roadside, where they may be conveniently hooked up to a relay or to the terminals of any desirable circuit.

In Fig. 6 the conductor also constitutes a substantially rectangular coil 20, but the latter is placed in a horizontal plane close to the surface of the pavement. In this case the effect of the reverse E. M. F. induced in the second crosswise leg of the rectangle is reduced by placing said second leg 22 at a distance from the first 21, wherefore the reverse E. M. F. will not occur simultaneously with the direct E. M. F. As in Fig. 5 the transverse legs extend half way across the road, more or less, on the right hand side of the same.

In practical tests I have obtained satisfactory results with coils of this type having from 50 to 100 turns, and with a distance between transverse legs varying from 5 to 12 feet.

In Fig. 7, I use as a conductor a similar coil 20 but placed in a vertical plane. This does away with the reverse E. M. F. induced in the return wires 22, because in this form the E. M. F.'s induced in the two transverse legs of the coil cooperate with each other instead of opposing each other. The sides 23 of the coil between the transverse legs are preferably brought up from under the surface of the pavement in hollow posts 24.

In Fig. 8, I use a coil 20 substantially like that in Fig. 6 only I bury one of the transverse legs 22 at a distance of several feet below the surface of the pavement, say 3 to 5 feet, while the other leg 21 is placed flush or nearly flush with the surface of the pavement. This type of coil combines the advantages of the types in both Fig. 5 and Fig. 6. By using this type of coil in combination with a polarized relay, one may effect the connections in such a manner as to close the local circuit of the relay (that is, the reinforced circuit) only in response to vehicles moving in a certain direction. Therefore, the transverse legs of the coil may be made to extend more than half-way across the road, so as to be sure to include in its zone all vehicles travelling forward along the crest of the road (instead of on the right-hand side) and still be inoperative for all vehicles returning along the crest of the road (instead of on the left-hand side).

In Fig. 9 is shown the relative disposition of the detector, sign, and road with respect to each other in a system where the object of the registration is to light a warning sign. The broken line 25 indicates the crest of the road. It will be noted that the sign post 30 is some 50 to 100 feet ahead of the loop, so as to be sure and catch the rider's eye without his active co-operation in this. The cells, relays, and other mechanisms necessary are not shown in the drawings. They may all be included in a box and supported on the post 30.

In Fig. 10, the road bends in a sharp curve, and is obscured by trees or brush 31. The approaches to the curve are designated A and B. On the approach A is installed a loop 20a. Its outlets 29a lead first to a sign post 30a and then to a horn 35a. Similarly, the loop 20b, on the approach B, is electrically connected to a sign post 30b, and horn 35b. The cells, relays, and other mechanisms necessary are omitted from the drawings. It will be clear that their disposition is immaterial, provided they are included in the circuit. It will be clear from the drawings that a vehicle approaching on the A side will automatically light a warning sign for itself (say, "Curve ahead") and simultaneously blow a horn on the B side warning any motorists approaching from that side. A similar series of events will follow the approach of a vehicle on the B side. Obviously, it is not necessary that the lamp and horn be used together and disposed exactly as shown. Thus the sign posts 30a and 30b may be entirely omitted, or, on the contrary, may be strengthened in effectiveness by providing them with a horn as well as with a light. Similarly, the horns 35a and 35b may be replaced by an electric bell or any other suitable warning device.

An audible signal may also be made to accompany any visual signal utilizing my invention, for instance the sign post 30 of Fig. 9. In this resides one of the big merits of my invention because it renders the signal effective in attracting attention.

In Fig. 11 I have shown in a diagrammatic manner the method of utilizing the induced E. M. F.'s for the purpose of observation or measurements. In this case, all that is necessary is to connect the terminals of the coil 20 directly to the terminals of a galvanometer G, or any suitable meter. It is clear that since the E. M. F. induced in the coil 20 is roughly proportional to the speed of the vehicle (neglecting variations due to different quantities of iron in different vehicles), one may roughly judge as to the speed of the passing vehicle.

In Fig. 12 I have shown diagrammatically the method of connecting the coil to a relay for the purpose of reinforcing the induced current. In a practical test I used a polarized relay having a sensitivity of about 200 microamperes per millimeter deflection, a resistance of about 1.7 ohms and a critical period of about 0.6 seconds. This relay 60 had two main terminals 61 and three local terminals 62, and 63—63. It works on the D'Arsonval galvanometer principle, and depending upon the direction of the main line current, it will close a contact on the right or on the left through the contact screws 65, 64. Therefore if a local battery and circuit are attached to only one of the terminals 63, 63, and if a coil like in Fig. 5 or Fig. 8 is used, the closing of the local circuit will depend on the direction of the vehicle, as above stated. In this circuit B is a battery of cells, and X is any load, such as a lamp or a mechanism.

In Fig. 13 I have shown for the purpose of illustration how the local circuit of the relay in Fig. 12 may be utilized to close an electric contact for a few seconds to be used, for instance, in sounding a horn or flashing a sign.

An electro-magnet 71, having a core 72, is provided with a pivoted armature 73, which is extended forward into a rod 74 carrying a mercury contactor 75, and backward into a threaded rod 76 carrying a movable balancing weight 77. The weight is adjusted so as to tip that end of the lever thus keeping the mercury contactor in open position. When the electro-magnet is energized by the brief local circuit from the relay in Fig. 12 the armature 73 is attracted, bringing the contactor 75 into closed position. Upon cessation of the local circuit, the balancing weight 77 brings the contactor back to broken position inside of an interval of time which may be predetermined at will by moving the balancing weight toward or away from the pivot. By moving the weight in close enough to the pivot, the system may be set so as to fail to return to open position at all, until reset by hand or by a special mechanism. Any other suitable timing device (for instance, balance wheel, dash pot, etc.) may be made to replace the balancing weight above discussed. The closed contactor may be utilized to blow a horn as a warning, or to light a lamp illuminating a sign.

Of course, any other suitable mechanism or relay may be used in place of the one herein described.

In Figs. 14 to 17 incl. I have shown further modifications in the method of installing the loop with respect to the road.

In Fig. 14 the loop 20 is in a vertical plane parallel to the road on one side thereof and as close to the road as possible without interfering with the traffic. The height of the loop need not be more than 3 to 5 feet. It may be supported by means of wooden posts (not shown in the drawings) or in any other suitable manner.

In Fig. 15 the loop is placed in a vertical plane as in Fig. 14, but one vertical leg of the loop 22 is further removed from the edge of the road than the opposite vertical leg 21. The object of this is to decrease the reverse E. M. F. induced in the leg 22, as explained above under Fig. 5.

In Fig. 16 a vertical plane coil is used as in Figs. 14 and 15, only it is turned substantially at right angles to the road. The leg 21 is then quite removed from the road, and the reverse E. M. F. is negligible.

Fig. 17 combines the features of both Fig. 5 and Fig. 14. The loop here is no longer in one plane, but partly in a horizontal and partly in a vertical plane. This type of loop thus exposes a longer segment thereof to the effect of the moving magnetic field, and is therefore more sensitive, per turn of wire, than the corresponding coils of Fig. 4 and Fig. 14.

In Fig. 18 I have shown how my invention may be used in connection with a street intersection. On each of the four approaches to the intersection is placed one of my registering units, preferably at a distance of 50 to 100 feet from the corner. The two loops on each street may be connected together, either in series or in parallel, to the same relay or other mechanism. Thus the effect of the opposite traffic on each street is the same as though it all moved in one direction.

It will be understood that my invention is not limited to the precise embodiments shown. Thus while I have shown it applied to a highway or street for operating a signal, it may also be used on private grounds for any purpose whatever. Thus it may be installed in the driveway of a gasoline station to operate a "Welcome" sign to incoming patrons. It may be used on the grounds of a public fair for operating an advertising sign. It may be used on a bridge or highway to operate a counting mechanism for the purpose of recording the number of vehicles passing that zone in a given time. It may also be used in connection with a toll road to call out the gate keeper.

While I have shown the utilization of the earth's natural magnetic field, it will be clear that the same may be reinforced by placing a permanent magnet or an electro-magnet in proximity to the road in such a manner as to reinforce the earth's field. In fact one may create an artificial magnetic field so strong as to render the earth's field negligible in comparison therewith.

It will be further noted that the device for detecting the changes in magnetic field may be either of a type as to operate on changes in direction, as in Figs. 1 to 4, or of a type which is operated by changes in intensity, as in Figs. 5 to 17. Any other device which is capable of detecting either type of change or both may be used to replace the devices disclosed.

It will thus be seen that my invention is of a broad scope and should not be construed as limited in any sense except as defined by the following claims.

In the claims below where the phrase "normal magnetic field" or its equivalent is used it should be understood to comprise both the normal natural magnetic field as well as the normal condition of an artificially maintained or artificially reinforced magnetic field in a given zone. Also where the word "changes" is used in connection with a magnetic field, it should be understood to comprise changes in intensity, and changes in direction, or changes in both intensity and direction. Also, where the term "road" is used it should be understood to include any path adapted for the passage of a land vehicle, whether on the surface of the earth or in a mine, whether public or private, whether a permanent road or a path built for a special occasion, whether commonly called "road" or designated by a special name such as street, alley, highway, bridge, viaduct, boulevard, dirt road, cinder path.

By the term "automobile-type vehicle" or "vehicle of the automobile type" in the claims below I mean to designate freely moving land vehicles such as automobiles, trucks, motor-cycles, motor-cars, motor-buses, and similar vehicles (generally driven by a gasoline motor), which are adapted to move in an arbitrary straight or curved line over any common road or even over unimproved but fairly even dry land, as distinguished from railroad trains, street cars and similar vehicles (generally propelled by a steam engine or electric motor), which travel on iron rails and are therefore confined in their motion to the precise path laid out for them by these rails.

The term "indicator" as used in the following claims is intended to include broadly signals, signs, or other devices adapted to respond, through intermediate means, if necessary, to the passage of a vehicle.

I claim:

1. In combination with a roadway designed for automobile type traffic, an indicator; an electric circuit; a conductor in said circuit, said conductor being situated in proximity to the path of the traffic and in position to be traversed by the disturbance of the earth's magnetic field normally attending the passage of an automobile over the roadway with a resultant induction of an electromotive force in said circuit; and means responsive to said electromotive force to operate said indicator.

2. In combination with a roadway designed for automobile type traffic, an electric circuit; a conductor in said circuit, said conductor being situated in proximity to the path of the traffic and in position to be traversed by the disturbance of the earth's magnetic field normally attending the passage of an automobile over the roadway with a resultant induction of an electromotive force in said circuit; a second electric circuit containing contact elements; and means responsive to said electromotive force to actuate said contact elements.

3. In combination with a roadway designed for automobile type traffic, a coil of wire in the form of a loop of large area and comparable to the size of an automotive vehicle, said coil being situated in a magnetic field in proximity to the path of traffic and in position to be traversed by the magnetic disturbances of said field normally attending the passage of an automobile over the roadway past said coil with a resultant induction of different values of electromotive forces in opposite effective sides of said coil, said coil being provided with free terminals for connection with electrical apparatus.

4. A combination as in claim 3, the loop being substantially flat, and disposed in a plane substantially parallel to the direction of the roadway.

5. A combination as in claim 3, the loop being substantially flat and disposed in a plane at an angle to the direction of the roadway.

6. In combination with a roadway designed for automobile type traffic, a coil of wire in the form of a loop of large area said coil being situated in the earth's magnetic field in proximity to the path of the traffic and in position to be traversed by the magnetic disturbances of the earth's field attending the passage of an automobile over the roadway past said coil with a resultant induction of an electromotive force in said coil, said coil being provided with free terminals for connection with electrical apparatus.

7. A combination as in claim 1, said circuit containing no sources of electrical energy.

8. A device for detecting the motion of an automobile type vehicle through a given zone in a road comprising a coil of wire in the form of a loop of large area and a plurality of turns; said loop being situated in proximity to the zone and having at least a portion thereof extending in proximity to the path of the vehicle, and having the portion thereof opposite to said first portion removed a considerable distance from said zone.

9. A device as in claim 8, the coil being so disposed with respect to the average path of vehicles through said zone, that the distance between said opposite portion and said average path is several times the distance between said first portion and said average path.

10. In combination with a roadway designed for automobile type traffic, an indicator; an electric circuit; a coil of wire in said circuit, said coil of wire being situated in proximity to the path of the traffic and comprising a plurality of loops connected in series and surrounding a normally constant magnetic field; said loops being disposed in interlinking relation to said magnetic field, whereby to be traversed by magnetic disturbances of said field normally attending the passage of an automobile over the roadway, with a resultant induction of an electromotive force in said circuit, and means responsive to said electromotive force to operate said indicator.

11. A combination as in claim 10, said circuit containing no sources of electrical energy.

12. In combination with a roadway designed for automobile type traffic, a coil of wire comprising a plurality of loops interlinked with the lines of force of a normally constant magnetic field located in proximity to the path of the traffic, said loops being so disposed in relation to said field as to be traversed by the magnetic disturbances of said field normally attending the passage of an automobile over the roadway past said field with a resultant induction of electromotive force in said loops, said coil being provided with free terminals for connection with electrical apparatus,

DAVID KATZ.